3,180,852
POLYURETHANE PLASTICS
Johannes Pfirschke, Leverkusen, Wilhelm Altner, Opladen, and Hans Scheurlen, Leverkusen, Germany, assignors to Farbenfabriken Bayer Aktiengesellschaft, Leverkusen, Germany, a corporation of Germany
No Drawing. Filed May 9, 1960, Ser. No. 27,499
Claims priority, application Germany, May 8, 1959, F 28,399
6 Claims. (Cl. 260—77.5)

This invention relates to the production of plastics. More particularly, this invention relates to the production of plastics from raw materials which have been heretofore considered as waste products.

It is known to prepare organic isocyanates by the phosgenation of the corresponding organic amine. The phosgenation of an amine to prepare an organic isocyanate may be carried out either batchwise or continuously. In the batch process a solution of phosgene is prepared at about 0° C. in a vessel equipped with a stirrer, phosgene and part of the solvent required for the phosgenation. An amine solution is prepared in a separate vessel from the balance of the solvent and the amine. The amine solution is then added to the phosgene solution with stirring while cooling the reaction mixture in the so called cold phosgenation step. The mixture is then slowly heated to a temperature of about 160° to about 170° C. and additional phosgene is added to the reaction mixture to complete the phosgenation of the amine to the corresponding organic isocyanate. When the reaction of the amine is complete, the excess phosgene is removed by means of an inert gas such as nitrogen or carbon dioxide.

The phosgenation can also be carried out continuously by preparing a suspension of the amine and then passing the phosgene into the solution at a low temperature followed by continuously forcing the reaction product through one or more heated tubes in which the material is heated to the phosenation temperature while adding additional gaseous phosgene, if neecessary.

The organic isocyanate is recovered from the reaction product of either process by distillation. The distillation of the organic isocyanate from the reaction mixture leaves a distillation residue which heretofore had to be discarded or treated to regenerate the starting amine. Regeneration of the starting amine is not always satisfactory because additional processing equipment is necessary. Therefore, it is desirable to be able to use the distillation residues directly. Typical processes for the phosgenation of amines may be found in U.S. Patents 2,680,127 and 2,822,373.

It is, therefore, an object of this invention to provide a process for the preparation of plastics from the distillation residue obtained in the production of an organic isocyanate by the phosgenation of the corresponding amine. Another object of this invention is to provide improved polyurethane plastics. A further object of the invention is to provide a process for the utilization of the distillation residue obtained in the production of organic polyisocyanates. A further object of the invention is to provide a process for the preparation of cellular polyurethane plastics. Another object of the invention is to provide a process for the preparation of substantially nonporous polyurethane plastics. Still another object of the invention is to provide a process for the preparation of polyurethane castings and moldings from the distillation residue obtained in the production of organic isocyanates by the phosgenation of the corresponding amine.

The foregoing objects and others which will become apparent from the following description are accomplished in accordance with the invention, generally speaking, by providing plastics obtained from an organic compound containing at least two active hydrogen containing groups as determined by the Zerewitinoff method and the distillation residue obtained by distilling an organic isocyanate from a mixture thereof with by-products obtained in the phosgenation of an amine. Thus, this invention contemplates a process for the preparation of polyurethane plastics wherein an organic compound containing at least two active hydrogen containing groups as determined by the Zerewitinoff method is reacted with the distillation residue obtained when an organic isocyanate is distilled from the reaction mixture in which it was prepared by the phosgenation of the corresponding amine. It was not to be expected that the distillation residue would react with the organic compound containing active hydrogen containing groups because when the residue is heated alone no additional isocyanate can be recovered. However, when the distillation residue is mixed with an organic compound containig active hydrogen containing groups —NCO groups in the distillation residue become available for reaction and combine with the residue to form a plastic. In accordance with a preferred embodiment of the invention the distillation residue obtained in the production of an aromatic polyisocyanate, wherein an aromatic polyamine is reacted with phosgene to prepare said aromatic polyisocyanate, is reacted with an organic compound containing at least two active hydrogen containing groups such as hydroxyl groups, primary amino groups, secondary amino groups, carboxylic acid groups and the like to prepare a plastic.

The distillation residue from the distillation of any organic isocyanate from the solution in which it was prepared by the phosgenation of the corresponding amine may be used in accordance with the present invention. The distillation residues referred to herein generally contain from about 20 weight percent to about 60 weight percent available isocyanate. If the distillation residue is released from the still immediately after removing the isocyanate, it is a black tarry liquid but once it has been allowed to solidify by cooling to a lower temperature of about 100° C. or less it can no longer be liquefied by simply heating it back to the temperature at which it was discharged from the reactor. The distillation residue becomes a hard brittle mass which must be ground in a ball mill, hammer mill or the like to produce a fine powder which can be dispersed in an organic solvent to promote mixing with an organic compound containing at least two active hydrogen containing groups as determined by the Zerewitinoff method. The chemical composition of these residues is not clear but any suitable distillation residues obtained from the distillation of an isocyanate from the reaction mixture of an amine and phosgene may be used. Any distillation residues from organic diisocyanate or higher organic polyisocyanate preparation may be used to produce the plastics of the invention. Thus, the distillation residues may be used which are obtained in the production of any suitable isocyanate including aromatic, aliphatic and heterocyclic isocyanates such as, for example, ethylene diisocyanate, ethylidene diisocyanate, propylene-1,2-diisocyanate, cyclohexylene-2,4-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 4,4'-biphenylene diisocyanate, 3,3'-dichloro-4,4'-biphenylene diisocyanate, p,p',p''-triphenylmethane triisocyanate, 1,5-naphthalene diisocyanate, furfurylidene diisocyanate and the like.

It is preferred to use the distillation residue obtained in the production of aromatic polyisocyanates including 2,4-toluylene diisocyanate, and mixtures thereof with 2,6-toluylene diisocyanate, p-phenylene diisocyanate, 4,4'- diphenylmethane diisocyanate, 4,4'-diphenyldimethylmethane diisocyanate and 1,5-naphthalene diisocyanate. The distillation residue obtained in the phosgenation of amines to produce an organic polyisocyanate by the process disclosed in German Patent 949,228 is particularly useful. The residues obtained in accordance with this process contain a content of diisocyanate which amounts to approximately 40 to 50 percent by weight.

Any suitable organic compound containing at least two active hydrogen containing groups as determined by the Zerewitinoff method may be used for reaction with the above-defined distillation residues. It is preferred that these organic compounds have a molecular weight of at least about 500, hydroxyl numbers within the range of from about 25 to about 600, acid numbers below about 15 and most preferably below about 2. Thus, suitable organic compounds containing at least two active hydrogen containing groups include polyesters, polyhydric polyalkylene ethers, polyhydric polythioethers, hydrocarbon polyols, hydrocarbon thioalcohols, polyamines and the like. In addition polyhydric alcohols, thioalcohols, polyamines and polycarboxylic acids of low molecular weight which contain two or more —OH, —SH, —NH—, —NH$_2$ or —COOH groups may be used such as, for example, ethylene glycol, diethylene glycol, triethylene glycol, butylene glycol, glycerine, trimethylol propane, 1,3,6-hexanetriol, pentaerythritol, sorbitol, 2,3 - dimercapto propane, 2,3 - dimercapto-1-propanol, butyryl urea, ethylene diamine, 1,6-hexane diamine, diethylene triamine, triethylene tetramine, succinic acid, adipic acid, and the like. The polyesters employed in accordance with the present invention may have either terminal hydroxyl groups or carboxylic acid groups and may be prepared from the above-mentioned polyhydric alcohols and a polycarboxylic acid such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemilellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid and the like. The polyesters may be polyesteramides such as are obtained by including a polyamine, such as one of those set forth above in the reaction mixture with the polycarboxylic acid and polyhydric alcohol. It is preferred that the polyesters have terminal hydroxyl groups.

Any suitable polyhydric polyalkylene ether may be used such as, for example, the condensation product of an alkylene oxide or an alkylene oxide with a polyhydric alcohol. Any suitable polyhydric alcohol may be used such as those disclosed above for use in the preparation of the hydroxyl polyesters. Any suitable alkylene oxide may be used such as, for example, ethylene oxide, propylene oxide, butylene oxide, amylene oxide and the like. Of course, the polyhydric polyalkylene ethers can be prepared from other starting materials such as, for example, tetrahydrofuran, epihalohydrin such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols and the like. It is often advantageous to employ some trihydric or higher polyhydric alcohol in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pp. 257–262, published by Interscience Publishers Inc. (1951) or in U.S. Patent 1,922,459.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Suitable polyhydric polythioethers are disclosed in U.S. Patents 2,862,972 and 2,900,368.

It is also possible to react the distillation residues with water or compounds which will split off water at relatively high temperatures such as, for example, substances containing water of crystallization such as, for example, manganous chloride hydrate and compounds containing water in their molecular structure such as the natural or synthetic sodium alumino-silicates or molecular sieves such as those disclosed in U.S. Patent 2,882,244.

It is to be understood that other compounds may be included in the reaction mixture leading to the production of the plastics of the invention. Those compounds which contain both hydroxyl groups and primary or secondary amino groups as well as carboxylic acid groups in the molecule, reaction accelerators such as, for example, tertiary amines and organo-tin compounds as well as organic or inorganic fillers including sawdust, paper, cellulose, textile fabrics, crushed stone, asbestos, finely divided silica and the like as well as dyes and other additives may be used. Any suitable tertiary amine may be used, such as, for example, triethylene diamine, N-methyl morpholine, N-ethyl morpholine, diethyl ethanolamine, N-coco morpholine, 1-methyl-4-dimethyl amino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine and the like. Other suitable catalysts are for example, tin compounds such as, stannous chloride, tin salts of carboxylic acids, such as dibutyl tin di-2-ethyl hexoate as well as other organo metallic compounds such as are disclosed in U.S. Patent 2,846,408.

The plastics of the invention are prepared by combining the distillation residues defined above with the organic compounds containing at least two active hydrogen containing groups and heating the resulting mixture to liberate the isocyanato groups in the distillation residue. Either a deficiency or an excess of the compounds having reactive hydrogen atoms may be used. The latent isocyanate present in the distillation residue may be determined by dissolving a weighed quantity of the residue in dry dioxane and heating the mixture while adding a measured quantity of 2-n-dibutyl amine. The resulting mixture is heated for about one hour on a boiling water bath and diluted with methanol after cooling. By titrating back the excess of amine with one normal hydrochloric acid against bromophenol blue, the quantity of isocyanate can be determined. Since the isocyanato groups are released on heating, the reaction with the distillation residue is carried out at elevated temperatures preferably within the range of from about 150° C. to about 300° C. The mixture of the distillation residue with the organic compound containing active hydrogen containing groups is preferably effected mechanically in a three roll mixer, a kneader or other similar mixing arrangement depending on the nature of the mixtures. If this process is followed, a crumbly mass will be obtained which can then be pressed in a mold and heated to a temperature between about 150° C. and about 300° C. to produce a hard plastic. Thus, thermosetting resins may be produced. Alternately, a mixture may be prepared which will flow into a mold by including a solvent and heating the resulting mixture to a temperature of about 150° C. to about 300° C. This solution may then be cast in a mold and cured to produce a polyurethane casting.

Cellular polyurethane plastics can be prepared by combining the distillation residue in finely divided form with one of the organic compounds containing at least two active hydrogen containing groups as more particularly defined above and water. The resulting cellular polyurethane plastic has surprisingly god compressive strength. The products obtained in accordance with the present invention have good dielectric strength and high thermal stability and may be used for both thermal and sound insulation as well as in the production of molded items such as gaskets and the like. The products may also be used for the preparation of laminated structures such as laminated paper or textile webs. According to this process the comminuted distillation residue is mixed with an organic compound containing at least two active hydrogen containing groups and coated on the material to be laminated. When the laminae are pressed together, a firm bond results. Surface coatings can also be produced by mixing the distillation residue with an organic compound containing at least two active hydrogen containing groups in a suitable organic solvent such as xylene, ethyl acetate and the like and coating the resulting mixture on a substrate such as metal, for example, steel, wood, paper and the like, and heating it to a temperature of at least about 150° C. to bring about curing thereof.

As set forth above the distillation residues employed in accordance with the process of the present invention cannot be liquefied by simply heating them to the temperature at which they were drained from the still. Therefore, it was not to be expected that they could be caused to react with an organic compound containing at least two active hydrogen containing groups to prepare a plastic. It has been found as set forth above that these compounds will react with an organic compound containing at least two active hydrogen containing groups if they are combined therewith and heated to a temperature of at least about 150° C. and preferably to a temperature within the range of from about 150° C. to about 300° C. Moreover, it was to be expected that the plastics obtained would be inferior to those obtained from the pure organic polyisocyanate. This has not proven to be true. On the contrary, the plastics obtained from the distillation residue have improved properties for several applications. Their dielectric properties as well as their thermal stability is improved over that obtained in the casting of the reaction product of a pure organic polyisocyanate and an organic compound containing at least two active hydrogen containing groups. These reaction products may, therefore, be used for potting some electrical components which could not be satisfactorily potted with the heretofore known polyurethane casting mixtures. In addition, the products of the invention may be used for both thermal and sound insulation and in the production of gaskets, bearings and the like.

The invention is further illustrated by the following examples in which the parts are by weight unless otherwise indicated.

*Example 1*

About 1 part of a distillation residue, such as that formed during the production of a toluylene diisocyanate mixture, starting from a mixture of 65 percent of toluylene-2,4-diamine and 35 percent of toluylene-2,6-diamine, using the method disclosed in German patent specification No. 949,228, the isocyanate content which can be split off from such residue being about 43.5 percent is intimately mixed with about 1 part of a polyester of adipic acid, phthalic acid and hexanetriol, with an —OH number of about 275, and about 2 parts of sawdust, on a roller heated to about 100° C. The crumbly sheet which is obtained is comminuted and pressed in a press at about 210° C. for about 10 minutes. The pressed plate thereby obtained has a bending strength of about 1000 kg./cm.$^2$, a notch impact toughness of about 5 cm. kg./cm.$^2$ and a dimensional stability under heat according to Martens, of about 150–170° C.

If the residue referred to above is replaced by one such as that formed when processing pure toluylene-2,4-diamine by the procedure disclosed in German patent specification No. 949,228, an analogous result is obtained.

*Example 2*

90 parts of the distillation residue of Example 1 are intermediately mixed for 3 hours in a kneader heated to about 100° C. with 30 parts of 1.1.1-trimethylolpropane, 4.5 parts of phthalic acid anhydride and 90 parts of wood flour. The mixture is heated under the press for 20 minutes at 220° C.

The pressed plate thereby obtained has a bending strength of about 220 kg./cm.$^2$ and a Brinell hardness of 2600.

It is to be understood that any other suitable distillation residue, organic compound containing at least two active hydrogen containing groups and the like could have been used in the preceding examples with satisfactory results providing that the teachings of the foregoing disclosure are adhered to.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. Polyurethane plastics obtained by a process which comprises heating to a temperature of at least about 150° C. an organic compound containing at least two active hydrogen containing groups as determined by the Zerewitinoff method with the comminuted distillation residue obtained by distilling an organic polyisocyanate from a mixture thereof with byproducts obtained in the phosgenation of the corresponding primary amine to produce said organic polyisocyanate.

2. The polyurethane plastics of claim 1 wherein said organic polyisocyanate is a toluylene diisocyanate.

3. The polyurethane plastics of claim 1 wherein said organic polyisocyanate is a diphenyl methane diisocyanate.

4. The polyurethane plastics of claim 1 wherein said heating is within the range of from about 150° C. to about 300° C.

5. The polyurethane plastics of claim 1 wherein said organic compound containing at least two active hydrogen containing groups is a polyhydric polyalkylene ether having a molecular weight of at least about 500.

6. The polyurethane plastics of claim 1 wherein said distillation residue contains from about 20 percent to about 60 percent by weight available isocyanate.

References Cited by the Examiner
UNITED STATES PATENTS

| | | | |
|---|---|---|---|
| Re. 24,514 | 8/58 | Hoppe et al. | 260—2.5 |
| 2,680,127 | 6/54 | Slocombe et al. | 260—453 |
| 2,683,730 | 7/54 | Seeger et al. | 260—75 |
| 2,865,940 | 12/58 | Nobis et al. | 260—75 |
| 2,888,409 | 5/59 | Bender et al. | 260—2.5 |
| 2,978,449 | 4/61 | France et al. | 260—2.5 |

OTHER REFERENCES

Monsanto Technical Bulletin, No. P-144, Feb. 1, 1953.

LEON J. BERCOVITZ, *Primary Examiner.*

D. ARNOLD, *Examiner.*